(12) United States Patent
Zimmer (10) Patent No.: US 7,120,778 B2
(45) Date of Patent: Oct. 10, 2006

(54) OPTION ROM VIRTUALIZATION

(75) Inventor: Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 10/782,504

(22) Filed: Feb. 18, 2004

(65) Prior Publication Data

US 2005/0182913 A1    Aug. 18, 2005

(51) Int. Cl.
G06F 12/00    (2006.01)
(52) U.S. Cl. ...................... 711/202; 711/203
(58) Field of Classification Search ......... 711/202–209
See application file for complete search history.

(56) References Cited

U.S. PATENT DOCUMENTS

| | | | |
|---|---|---|---|
| 6,098,158 A * | 8/2000 | Lay et al. ................... | 711/162 |
| 2005/0144405 A1* | 6/2005 | Doran et al. ................ | 711/156 |

* cited by examiner

Primary Examiner—Nasser Moazzami
(74) Attorney, Agent, or Firm—Blakely, Sokoloff, Taylor & Zafman LLP (57) ABSTRACT

A method and system for virtualizing images. Multiple images are shadowed (i.e., copied) into portions of the physical address space of system memory. A mapping mechanism is effected to map all of the images into a common virtual address space, wherein images in the virtual address space are overlapped, thus enabling the images to be logically stored in a portion of virtual memory having a size less than the aggregated size of the images. In some embodiments, the images comprise option ROM images, which are shadowed into system memory during the pre-boot of a computer system. Due to legacy requirements, the option ROM images must be logically located in a limited portion of virtual memory (i.e., the common virtual address space). The embodiments enable a large number of option ROM images to be shadowed at the same time. In one embodiment, system hardware is programmed by firmware to effect a dynamic mapping between virtual pages at which an image is logically located to physical pages where the image is physically located.

30 Claims, 9 Drawing Sheets

OPTION ROM VIRTUALIZATION

FIELD OF THE INVENTION

The field of invention relates generally to computer systems and, more specifically but not exclusively relates to a mechanism for virtualizing option ROMs to enable a large number of option ROMs to be supported on a single platform.

BACKGROUND INFORMATION

Since the introduction of the personal computer (PC) architecture in 1981 and the ubiquitous PC-AT (advanced technology) architecture in 1984, PC-based computer systems have been continuously evolving. A concurrent evolution has likewise occurred with processors and operating systems. Although dramatic advancements have been made in each of these areas, the evolution process has been somewhat restricted due to legacy provisions. The legacy provisions result, in part, from the widespread popularity of PC's, which represent the vast majority of computers used worldwide. It is estimated that upwards of 100 million PC's are sold per year.

To better understand the reason for legacy provisions, consider that the PC-AT architecture is an open architecture, allowing literally 10's of thousands of peripheral components and software applications to be used on a PC-AT-based platform. Now consider the aspect of add-on peripherals. The PC-AT architecture introduced the industry standard architecture (ISA) bus and corresponding ISA expansion slots. Expansion slot architecture has evolved to include such variants as EISA (Enhanced ISA), microchannel (MC), ISA plug-n-play, and PCI (peripheral component interface), the current de-facto standard.

In order to maximize the potential market, peripheral components, such as add-on cards, have been designed to support the most basic common denominator—that is, the original PC-AT architecture. In particular, many of today's PC and PC-based server designs provide support for both ISA bus add-on cards and PCI add-on cards. ISA add-on cards are often referred to as "legacy" cards, due to their legacy requirements. Other architectures, such as PCI, provide mechanisms for supporting various legacy requirements. This continued support for legacy technology has generally restricted the level of enhancement that is provided in a new platform design. For example, it would be advantageous to start PC architecture anew, with a clean slate. However, this simply is not realistic.

One problem with legacy components and their carry-over designs is the original legacy architecture was designed in view of limited resources and thus, limited expandability. For example, at the time the PC-AT architecture was introduced, a "full" 640K (kilobytes) of memory was considered a large leap forward when compared with the 256K of memory common to the original PC architecture.

One provision that was added with the PC-AT architecture was the ability to provide optional firmware code on an "Option ROM (read-only memory)." Typically, an ISA or PCI add-on peripheral card may include an option ROM (also referred to as an expansion ROM for PCI) that contains object code or interpreter code that is used to initialize a peripheral device and possibly host a firmware-based interface between the peripheral card and an operating system. Basically, the option ROM architecture provides a convenient way to extend BIOS (basic input/output system) support to add-on peripherals without requiring a commensurate change to the system BIOS.

In accordance with legacy architecture considerations, PC option ROM code is mapped to a predetermined region of the physical memory address space. More specifically, the physical address space from 0xC0000p through 0xDFFFFp (p representing physical) is reserved for option ROM mapping. This includes two 64K memory regions known as the C-segment and D-segment, respectively. This provides for a 128K limit for all ISA and PCI option ROM code for a given system.

With the recent advancement in processor technologies, the computer system architecture landscape has dramatically changed. Modern processors, such as Intel's® IA-64 processor family, are designed to perform a large number of concurrent tasks. For example, an IA-64-based platform can provide the same service as a large number of individual servers that employ lesser processors. This can be particularly advantageous for supporting a large amount of I/O (input/output) channels, such as network channels and mass storage channels. As a result, various vendors have desired to deploy IA-64-based platforms that include multiple expansion slot racks or the like to provide support for 10's to 100's of add-on peripheral cards.

Firmware architecture advancements, such as the Enhanced Firmware Interface (EFI) standard, provide a means to ameliorate the 128-kbyte option ROM limit discussed above. However, most peripheral card manufacturer would prefer to design for a large target market, and many IT departments would like to implement existing ISA and PCI cards in their upgraded servers. As a result, the vast majority of existing peripheral cards do not support EFI. But what if the platform design is to support a moderate to large number of ISA legacy peripheral cards and/or PCI peripheral cards that include option ROMs? Under conventional practices, this is not possible, as the 128-kbyte option ROM limit would be quickly consumed, preventing mapping to the object or interpreted code for many, if not most, of the option ROMs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and systems for virtualizing code images, such as option ROM images are described herein. In the following description, numerous specific details are set forth, such as implementations using an IA-64 processor architecture, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, mechanisms are provided that enable multiple ISA legacy and PCI option ROMs to be mapped into a common virtual address space, whilst the actual option ROM images (i.e., code) is shadowed in various physical address space instances corresponding to the common virtual address space, or portions thereof. Furthermore, the mechanisms support both 16- and 32-bit option ROMs. The mapping of multiple physical address space instances into a virtual address space at which one or more option ROMs are logically located is referred to herein as "virtualization."

Figure 1A:
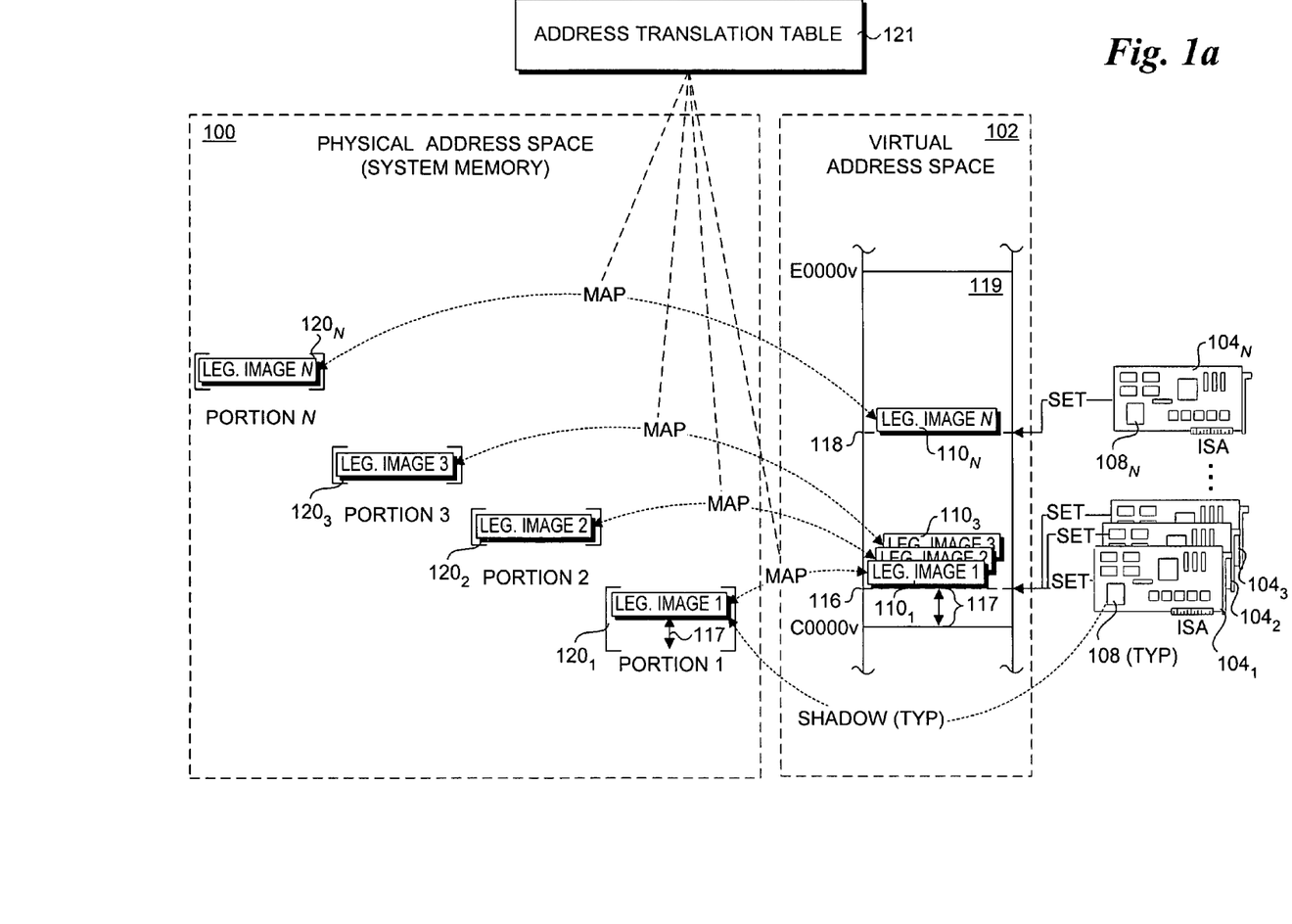
FIG. 1a is a schematic diagram of a scheme for virtualizing ISA legacy option ROM images, according to one embodiment.

One embodiment of an architecture scheme for providing the virtualization of ISA legacy options ROMs is shown in FIG. 1a. The architecture includes a physical address space 100 and a virtual address space 102. The physical address space 100 corresponds to the physically addressable system memory (e.g., RAM) for a platform. For example, if a platform has 1 Gbyte (gigabytes) of system memory, the physical address space will typically span between 0x0000 0000p and 0x3FFF FFFFp. It is noted that the physical address space of any actually system may also include physically addressable address space outside of system memory, such as system firmware address space; for the purpose of simplicity, the portion(s) of the physical address space outside of system memory is not shown.

Under conventional practices, an image of an option ROM for a given ISA legacy or PCI card is "shadowed" (i.e., copied) into the C- or D-segment of the physical address space. In other words, a copy of the option ROM image, which comprises firmware (e.g., BIOS) for a particular legacy device, is located within the physical address range from 0xC0000p and 0xDFFFFp. The location of a particular option ROM image will typically be set to a base address within one of the C- and D-segment. Typically, the base address will be on a 2K or 4K boundary at a given offset from the base of the segment, but this is not limiting. The amount of space allocated for each option ROM image will depend on the size of the image being shadowed. The base address is referred to as the "entry point" to the image. One reason for the C- and D-segment requirement is the option ROM image code expects to be located within this address range. As such, if located elsewhere the code may be rendered inoperable.

Generally, the particular offset or base address at which a legacy option ROM image is located is either set via a jumper or selectively programmed into the legacy card. For example, a jumper may be set to select a base address of 0xC1000, 0xC2000, etc. Similarly, the base address may be programmed using a set-up program or the like (e.g., for ISA plug-n-play cards). Although the C- and D-segments provide a 128K total address space, oftentimes much of the address space is unusable for legacy option ROMs. This is because a given ISA legacy card is generally configured to only permit a limited number of options at where its base address is set. This becomes a greater issue when a number of the same type of legacy card are to be employed in a single system.

Figure 1B:
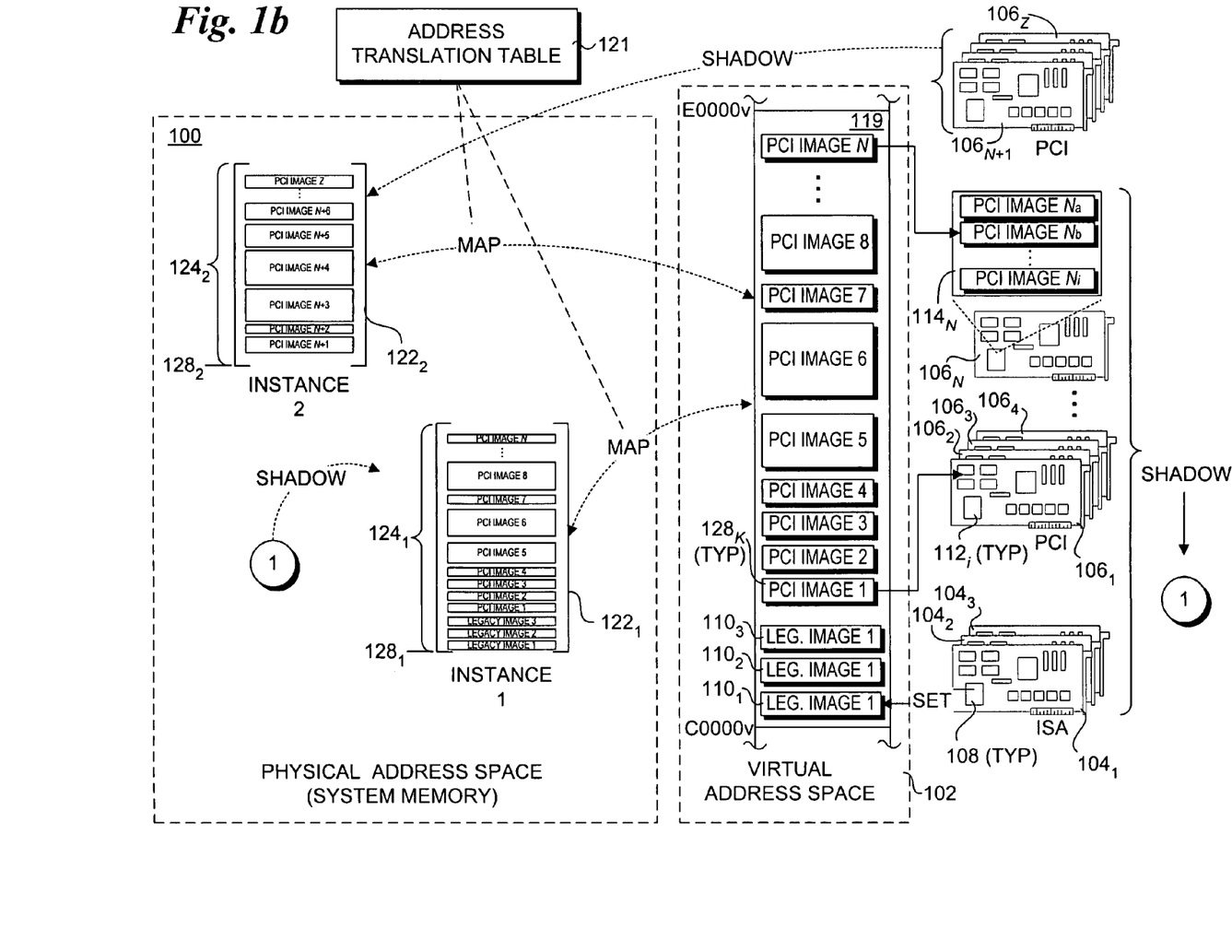
FIG. 1b is a schematic diagram of a scheme for virtualizing PCI and ISA legacy option ROM images, according to one embodiment.

Examples of such scenarios for ISA legacy cards only and a combination of ISA legacy cards and PCI cards are respectively illustrated in FIGS. 1a and 1b. The implementation of FIG. 1a includes a plurality of ISA legacy cards $104_{1-N}$, while the implementation of FIG. 1b includes a plurality of ISA legacy cards $104_{1-3}$ and two groups of PCI cards $106_{1-N}$ and $106_{N+1-Z}$. Each of ISA legacy cards $104_{1-N}$ includes a respective legacy option ROM $108_{1-N}$ containing a legacy option ROM image $110_{1-N}$. Each of PCI cards $106_{1-Z}$ include a respective PCI option ROM $112_i$ containing a set of one or more PCI option ROM images $114_i$. In addition, the system is configured to host additional cards having similar configurations to ISA legacy cards $104_{1-N}$ and PCI card $106_{1-Z}$; these additional cards are not shown for clarity.

For illustrative purposes, it will be assumed the each of legacy option ROM images $110_{1-3}$ are set to be shadowed to a common base address 116 having an offset 117 from the base address of the C-segment (0xC0000), while option ROM image 110N is set to be shadowed to a base address 118. It will further be assumed that other additional legacy cards not shown have their respective legacy option ROM images set to be shadowed at various base addresses, which may include common base addresses and/or the locations and size of the other option ROM images are such that a portion of those images are overlapping (thus creating an address contention conflict).

Under conventional practices for PC systems that use 32-bit processors, legacy option ROM images are shadowed somewhere in the C- and D-segments of the physical address space. As a result, the virtual address space 102 illustrated in FIG. 1 would comprise a physical address space, and the illustrated configuration would not work due to address contentions—that is, the code for multiple images attempting to occupy the same physical address space at the same time. This is because two legacy option ROM images cannot overlap the same physical address space, which would make the overlapped portion of their respective firmware code inoperative.

The embodiment of FIG. 1a solves this problem by physically locating the legacy option ROM images within the physical address space 100, while logically locating the legacy option ROM images within a common portion 119 of virtual address space 102 corresponding to virtual C- and D-segments. More specifically, legacy option ROM images that would normally have overlapping address ranges are shadowed into respective portions of the physical address space 100. The physical address space portions are then mapped into a virtual address space reserved for option ROM images via a mapping mechanism that employs an address translation table 121. In connection with the illustrated scheme, each of overlapping legacy option ROM images $110_{1-N}$ is shadowed into a respective physical address space portions $120_{1-N}$. The respective physical address spaces are then mapped into appropriate portions of virtual C- and D-segments in virtual address space 102.

In general, the size of the physical address space portions used to shadow a corresponding legacy option ROM image must be at least be equal to the size of that image. In one embodiment, the size of the physical address space used to shadow a given legacy option ROM image is the size of the image rounded up to the next logical boundary. For example, if the option ROM image has a size of 9.2K with a boundary increment of 4K, the size of the physical address space would be 12K. Physical address space portions $120_2$, $120_3$, and $120_N$ illustrate this embodiment.

In another embodiment, the size of a given physical address space portion is equal to the offset 117 from the virtual C-segment base address (i.e., virtual base address of optional ROM image—0xC0000v) plus the size of the option ROM image rounded up to the next logical boundary. For example, if the option ROM image is to be logically located at an offset of 16K from the virtual C-segment base and has a size of 9.2K with a boundary increment of 4K, the size of the physical address space would be 16K+12K=28K. An example of this is shown for physical address space portion $120_1$. In yet another embodiment, the size of the physical address space is equal to the size of the virtual address space reserved for option ROM images. In one embodiment, this size is 128K.

A similar, albeit somewhat different scheme is employed for virtualizing PCI option ROM images. Under the PCI architecture, an option ROM image may be located anywhere within the C- and D-segments reserved for option ROM images. This is advantageous, as the location for option ROM images for identical PCI cards do not need to be restricted to a limited set of options, such as is the case of ISA legacy cards.

More specifically, during the pre-boot, PCI cards are enumerated and PCI bridges are configured (including a PCI-to-legacy bridge). The option ROMs for the PCI cards are also shadowed during the pre-boot. In many instances, a PCI option ROM will contain multiple images, each targeted to a different processor type and/or platform. For illustrative purposes, an exemplary set of PCI option ROM images for PCI card $106_N$ are labeled PCI Image $N_{a-i}$ in FIG. 1. First, the entire option ROM contents are temporarily copied into some unoccupied area of system memory (location is unimportant at this point). The appropriate option ROM image for the processor/platform is then copied from the system memory into either the C- or D-segment of the physical address space (i.e., system memory), usually on a 2K or 4K boundary. As with legacy option ROMs, the size of a PCI option ROM image may vary. In some instances, these images can be relatively large. After the appropriate image has been copied, the portion of system memory used to temporarily store the option ROM contents is freed.

As the option ROM images for the enumerated PCI cards are loaded, a respective base address (i.e., entry point) for each image is selected by the pre-boot firmware and recorded. The algorithms for selecting the "next" base address include sequential schemes (which select the next logical (e.g., 2K or 4K) boundary after the end (i.e., top) of the last image that is loaded) and non-sequential schemes (e.g., best fit). Thus, this less-restrictive scheme enables a (generally) much larger number of PCI option ROMs to be employed for a given platform, depending on the sizes of the various PCI option ROM images, when compared with the ISA legacy option ROM scheme.

Although the conventional PCI option ROM shadowing scheme is an improvement over the ISA legacy scheme, the 128K limit of the C- and D-segment location requirement still exists. As a result, the number and/or size of the PCI option ROM images may create a situation where all of the images cannot be shadowed, and thus some PCI cards must be disabled or removed altogether.

The embodiment of FIG. 1b addresses this problem by mapping virtual address space 119 into respective physical address space instances $122_k$. In one embodiment, the physical location of the PCI option ROM images for given sets or groups of PCI cards are located within selectable 128K physical address space instances. Those 128K physical address space instances are then mapped into a common virtual address space destined for storing PCI option ROM images using mappings defined in address translation table 121. In one embodiment the virtual address space comprises virtual C- and D-segments.

For example, a set $124_1$ of PCI option ROM images $126_{1-N}$ for a set of PCI cards $106_{1-N}$ (labeled PCI IMAGE 1–N, respectively) are shadowed into a physical address space instance $122_1$, which has a base address 128, and a size of 128K. The physical address space instance $122_1$ is then mapped to the virtual C- and D-segments. Similarly, a set $124_2$ of PCI option ROM images $126_{N+1-Z}$ for a set of PCI cards $106_{N+1-Z}$ (labeled PCI IMAGE N+1–Z, respectively) are shadowed into a physical address space instance $122_2$, which has a base address $128_2$ and a size of 128K. The physical address space instance $122_2$ is likewise mapped to the virtual C- and D-segments.

It will be understood that the schemes of FIGS. 1a and 1b may be combined. For example, legacy option ROM images may be mapped to individual physical address space portions, while sets of PCI images are mapped into respective physical address space instances. Also, as shown in FIG. 1b, legacy and PCI option ROM images may be shadowed into the same physical address space instance. In the illustrated embodiment, physical address space instance $122_1$ is also used to shadow legacy option ROM images $110_1$, $110_2$, and $110_3$, which are hosted by respective ISA cards $104_1$, $104_2$, and $104_3$.

The embodiments discussed herein employ virtual addressing schemes employing virtual address spaces. Virtual address spaces represent addresses that don't physically exist, but rather are logical addresses. Under common terminology, physical addresses are addresses that physically exist in terms of hardware decoding. For example, if memory is installed in a given memory expansion slot (e.g., DIMM slot, SIMM slot, etc.), the physical addresses of the installed memory is fixed by the hardware.

The physical address scheme is often limiting. For one, it doesn't handle software location situations in which different amounts of physical memory are present on different systems. As a result, virtual addressing schemes are usually employed by modern operating systems (OS) to locate selective OS components at predetermined virtual addresses. For example, the kernel of a given operating system will always be located in the same virtual address space, regardless of the amount of system RAM that is available. This may be true for other selected OS components, as well.

In general, virtual addressing schemes may be implemented via software, firmware, and/or hardware. This provides for a great degree of flexibility, although there must be a consistent mechanism for mapping between virtual memory and the underlying physical storage device's addressing scheme. Another advantage of employing virtual memory is that virtual address schemes may extend virtual memory to storage resources outside of system memory. For example, disk-paging techniques are often employed to increase the amount of useable "memory" beyond the physical address space provided by the system memory.

In accordance with aspects of the embodiments described below, exemplary techniques and implementations are described using an Intel® 64-bit processor architecture, known as IA-64. The IA-64 architecture is used for the various processors in the Intel® Itanium® family.

The IA-64 architecture employs a virtual addressing model, which is fundamentally a 64-bit flat linear address space. 64-bit registers are used as pointers into this address space. The architecture also supports IA-32 32-bit virtual linear addresses, which are zero extended into the 64-bit virtual address space.

The 64-bit virtual address space is divided into eight $2^{61}$ byte virtual regions. A region is selected by the upper 3-bits of the virtual address. Associated with each virtual region is a region register that specifies a 24-bit region identifier for the region. Eight out of the possible $2^{24}$ virtual address spaces are concurrently accessible via 8 region registers. If desired, regions can be coalesced by assigning sequential region identifiers, e.g., to produce 62-, 63-, or 64-bit spaces.

Figure 2:
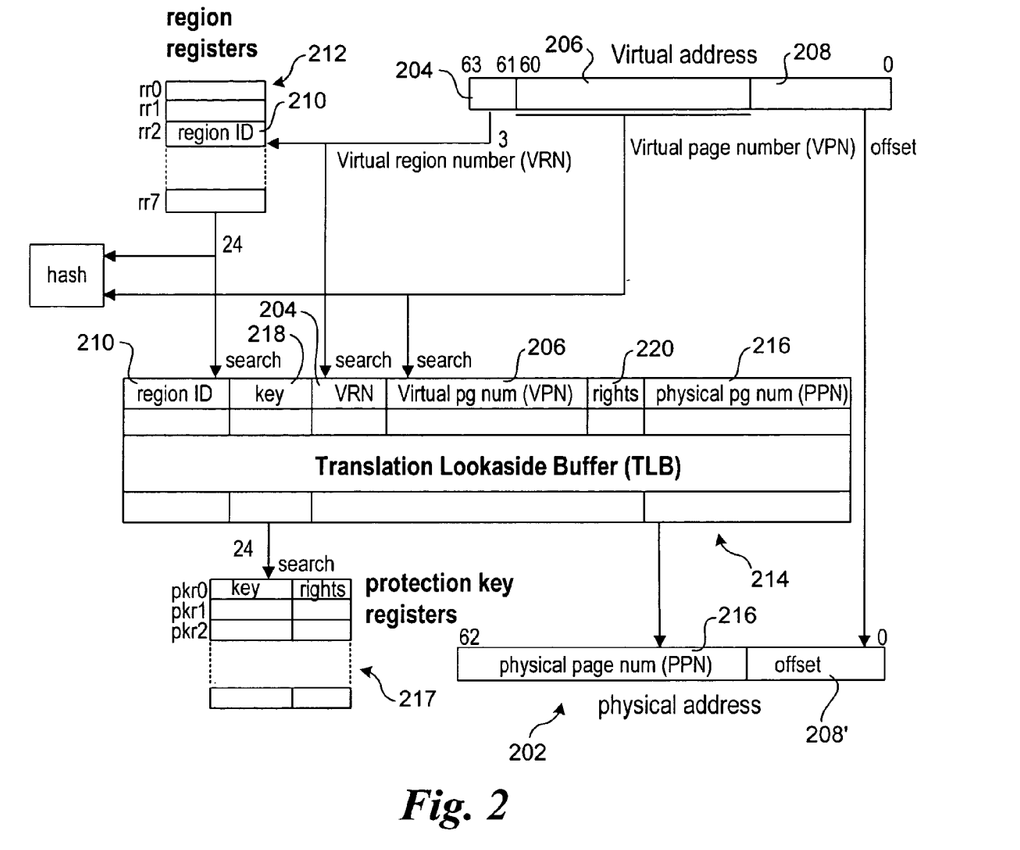
FIG. 2 is a schematic diagram of an address translation scheme including a translation lookaside buffer (TLB) employed by the IA-64 processor architecture.

FIG. 2 shows the process of mapping (also referred to as "translating") a virtual address 200 into a physical address 202. The bits of virtual address 200 are divided into three fields: 204, 206, and 208. Field 204 comprises the most-significant three bits 61–63, which are used to point to a virtual region number (VRN). Field 208, which comprise the least significant bits, form the page offset. The remaining bits, comprising field 206, are used to specify a virtual page number (VPN). The page-offset bits (field 208) are passed through the translation process unmodified, as shown by a physical address page offset 208'. Exact bit positions for the page offset and VPN bits (field 206) vary depending on the page size used in the virtual mapping. Allowable page sizes include 4K, 8K, 16K, 64K, 256K, 1M, 4M, 16M, 64M, 256M, and 4G.

On a memory reference (other than an insert or purge), the VRN bits of field 204 select a region identifier (RD) 210 from 1 of the 8 region registers 212. A translation lookaside buffer (TLB) 214 is then searched for a translation entry with a matching VPN and RID value. If a matching translation entry is found, the entry's physical page number (PPN) 216 is concatenated with the page-offset bits (offset 208') to form the physical address 202. Matching translations are qualified by page-granular privilege level access right checks and optional protection domain checks by verifying the translation's key is contained within a set of protection key registers 217 and read, write, or execute permissions are granted. The key value is defined in the TLB's key field 218, while access rights are specified in a rights field 220.

If a translation is not resident in the TLB, the processor may optionally search a virtual hash page table (VHPT) structure in memory (not shown) for the required translation and install the entry into the TLB. If the required entry cannot be found in either the TLB or VHPT, the processor raises a TLB Miss fault to request that the operating system supply the translation. After the OS installs the translation in the TLB and/or VHPT, the faulting instruction can be restarted and execution resumes.

Figure 3:
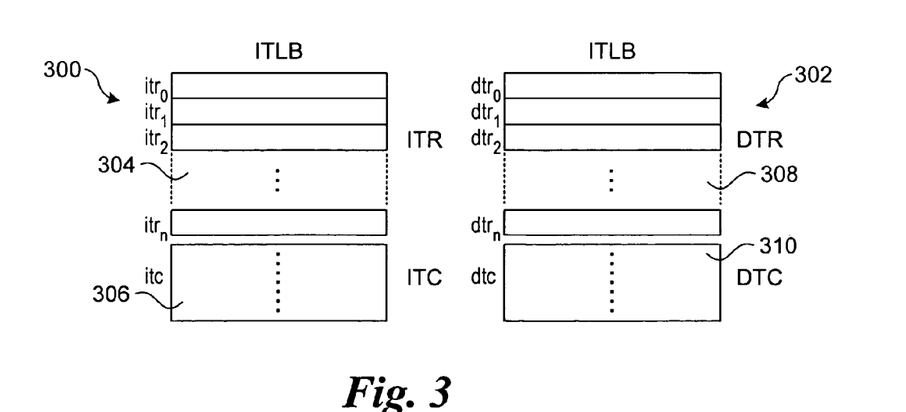
FIG. 3 is a schematic diagram illustrating further details of the TLB of FIG. 2, including translation registers.

An IA-64 processor maintains two architectural TLBs, as shown in FIG. 3, including an instruction TLB (ITLB) 300 and a data TLB (DLTB) 302. Each TLB services translation requests for instruction and data memory references (including IA-32), respectively. The data TLB 302 also services translation request for references by the RSE and the VHPT walker. Each of instruction TLB 300 and the data TLB 302 are further divided into two sub-sections: Translation Registers (TR) (ITR 304 and DTR 306) and Translation Cache (TC) (ITC 308 and DTC 310).

The Translation Register section of the TLB is a fully-associative array defined to hold translations directly managed by software (e.g. an OS) and/or firmware. Software/firmware may explicitly insert a translation into a TR by specifying a register slot number. Translations are removed from the TRs by specifying a virtual address, page size and a region identifier. Translation registers allow the operating system to "pin" critical virtual memory translations in the TLB. Examples include I/O spaces, kernel memory areas, frame buffers, page tables, sensitive interruption code, etc.

Entries are placed into a specific TR slot with the Insert Translation Register (itr) instruction. Once a translation is inserted, the processor will not automatically replace the translation to make room for other translations. Local translations can only be removed by issuing the Purge Translation Register (ptr) instruction.

In some instances, TR inserts and purges may cause other TR and/or TC entries to be removed. Prior to inserting a TR entry, software must ensure that no overlapping translation exists in any TR (including the one being written); otherwise, a Machine Check abort may be raided, or the processor may exhibit other undefined behavior. Under some error conditions, the processor may remove TR entries; notification is raised via a Machine Check abort. Further details of using the TBL and TR, including the translation insertion format, are available in the Intel® Itanium® Architecture Software Developers Manual, Vol. 2: System Architecture, Version 2.1, October, 2002.

In accordance with further aspects of some embodiments, a firmware-based mechanism is used to manage address translation using a "virtual TLB." The virtual TLB stores translation information defined by various virtual TR entries that are used to map portions and/or instances of the physical address space into the virtual address space, and vice-versa. In one embodiment, a virtual TLB is defined during the pre-boot, while processor TRs are dynamically programmed via the processor TLB on an as-needed basis. This scheme has the advantage of being totally scalable, enabling a large number of concurrent physical C- and D-segment instances, as well as mappings to optional physical address space portions having various sizes.

To better understand how firmware is employed in the following embodiments, attention is drawn to FIG. 4, which shows various software, firmware, and hardware (i.e., processor) layers and interfaces for the IA-64 architecture. An operating system software layer 400 sits at the top of the architecture. Various firmware components reside in the next three lower layers, including an extensible firmware interface (EFI) layer 402, a system abstraction layer (SAL) 404 and a processor abstraction layer (PAL) 406. The PAL is closely connected to processor operations, and thus sits atop a processor layer 408. The bottom layer in the architecture is the platform hardware 410.

Figure 4:
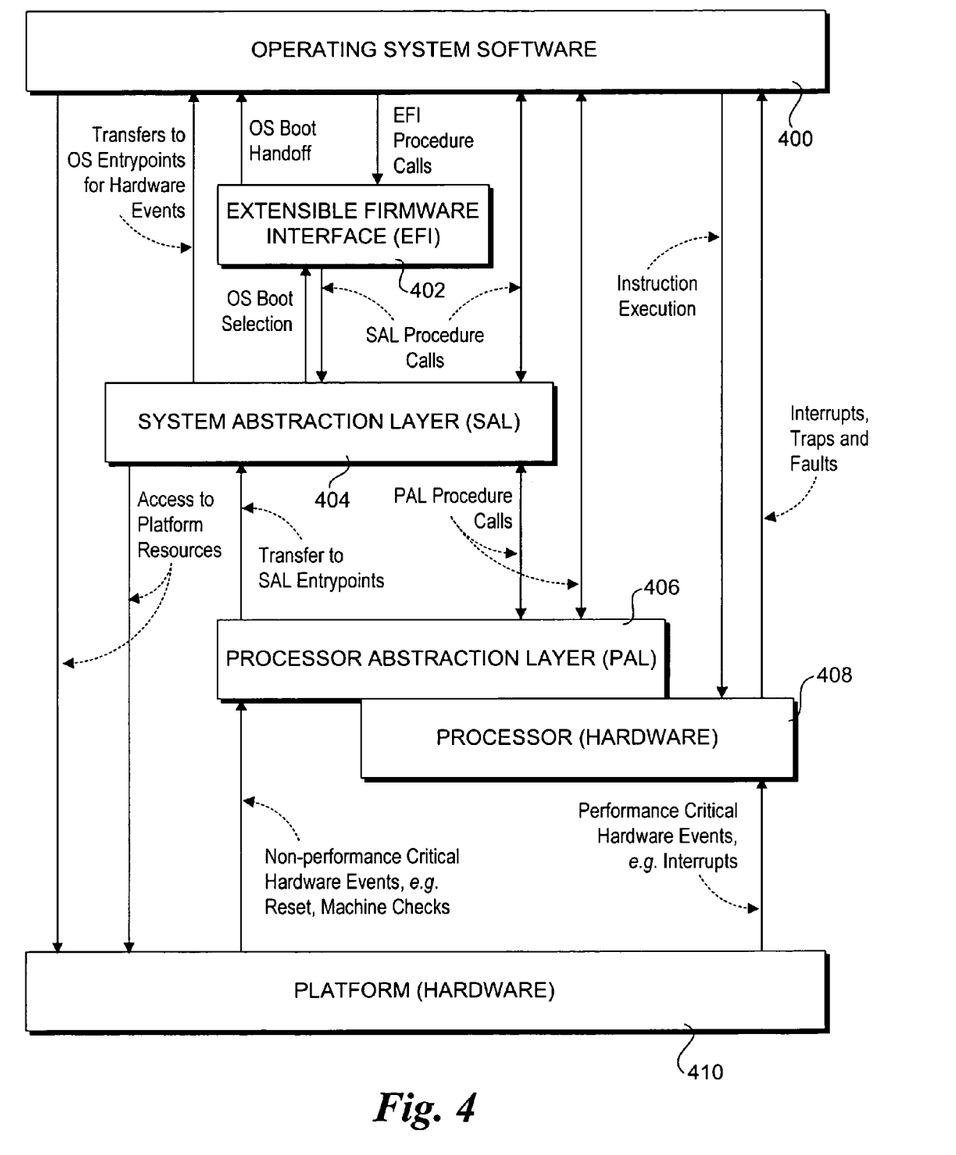
FIG. 4 is a schematic block diagram illustrating a firmware architecture for the IA-64 processor architecture.

The layered architecture of FIG. 4 forms an abstracted set of interfaces that enable a common operating system (binary) to operate on IA-64-based platforms having a variety of different configurations. At the same time, firmware-layer components are abstracted from the operating system, enabling those firmware component to support multiple operating systems, including but not limited to Microsoft Windows operating systems and various flavors of Linux and Unix operating systems.

PAL 406, SAL 404, and EFI 404 together provide system initialization and boot, Machine Check Abort (MCA) handling, Platform Management Interrupt (PMI) handling, and other processor and system functions which would vary between implementations. The interaction of the various functional firmware blocks is shown in FIG. 4. PAL 406 encapsulates processor implementation-specific features, while SAL 404 is the platform-specific firmware component that isolates operating systems and other higher-level software from implementation differences in the platform. EFI provides a legacy-free API interface to the operating system loader. EFI may also be configured to support legacy components, as well.

EFI is a public industry specification that describes an abstract programmatic interface between platform firmware and shrink-wrap operation systems or other custom application environments. The EFI framework include provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks. Specifications and examples of which may be found at http://developer.intel.com/technology/efi.

In one embodiment, an EFI component is employed to perform the aforementioned virtual TLB functionality. The EFI component may be written in native binary code (IA-64), IA-32 code, or an interpreted code, such as EFI byte code (EBC). The EFI component is loaded during the pre-boot in a manner known to those skilled in the IA-32 and IA-64 firmware art.

Figure 5A:
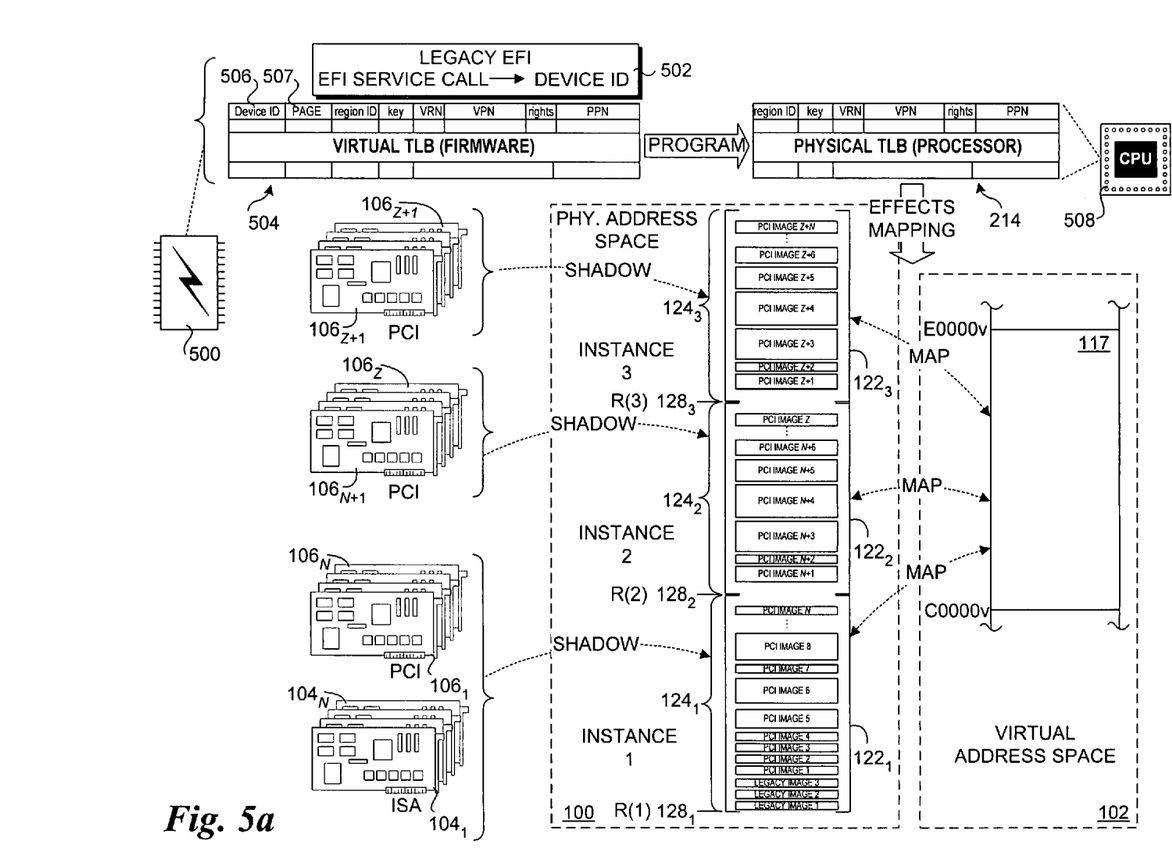
FIG. 5a is a schematic diagram illustrating an option ROM image virtualization scheme employing an IA-64 processor, according to one embodiment.

An embodiment of an EFI virtual TLB implementation for supporting multiple C- and D-segment physical address space instances that are mapped to a common virtual C- and D-segment instance is shown in FIG. 5a. In accordance with the EFI framework, various EFI firmware components stored on a boot firmware device (BFD) 500 and possibly other EFI stores (e.g., another firmware store, a local hard disk, or a network EFI image host) are loaded during the pre-boot to prepare the system for loading an OS, and to set up various EFI runtime services. The EFI components include a legacy EFI component 502 that maintains a virtual TLB 504. In one embodiment, the virtual TLB 504 includes a "Device ID" field 506 and "PAGE" field 507, in addition to the various TLB fields discussed above with reference to the processor TLB 214 of FIG. 2. Optionally, the virtual TLB 504 may also have an "Image ID" field, which may replace "Device ID" field 506 or be added to this field. It is noted that not all of the fields shown in TLB 214 need to be used, such as key field 218 and rights field 220.

Information in the virtual TLB 504 is used to dynamically program TR registers in a processor TLB 214 hosted by a processor 508 in response to certain BIOS events. Details for building the virtual TLB and other system initialization operations performed during the pre-boot are illustrated in the left-hand portion of the flowchart of FIG. 6.

Figure 6:
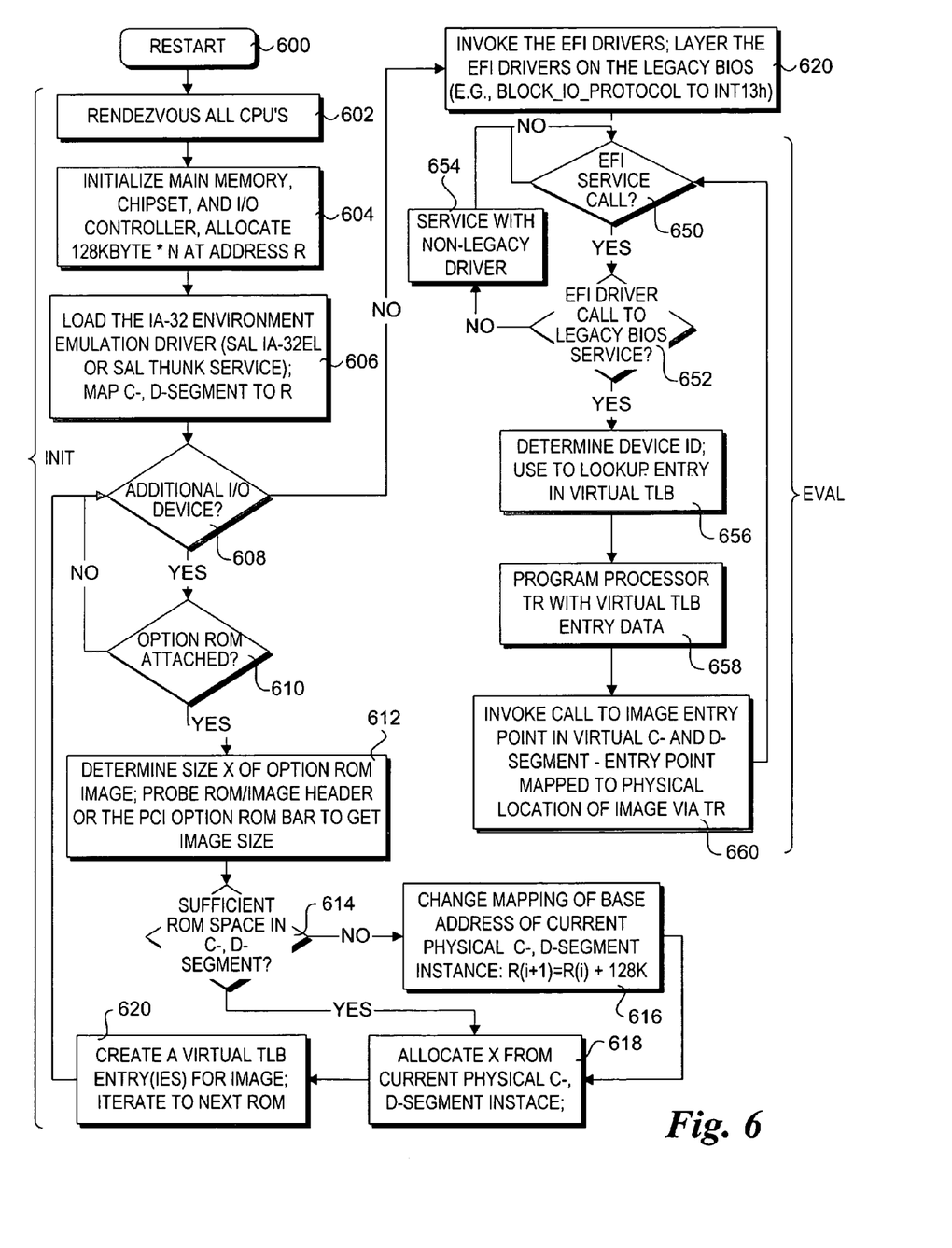
FIG. 6 is a flowchart illustrating operations and logic performed during initialization of the scheme of FIG. 5a and during evaluation operations illustrated in FIGS. 5a–c, according to one embodiment.

The process begins with a restart event in a block 600. The restart event may comprise a cold boot or a system reset. In response, all of the IA-64 processors (if a multi-processor system is implemented) are rendezvous in a block 602.

In a block 604, the main memory, chipset, and I/O controller are initialized. N *128K of physical memory is allocated at a base address R, wherein N represents the number of C- and D-segment instances that may be used. A typical IA-64 platform includes a relatively large amount of system memory, so N may be fairly large (e.g., >10) with minimal impact on memory resources. It is noted that N may be picked to be larger than the maximum number of instances expected, if desired.

In the embodiment shown in FIG. 5, N is set to 3 to allocate three 128K instances $128_{1-3}$, which sequentially consume 384K of physical address space 100, beginning at a base address R. The base addresses for the three instances $122_{1-3}$, are $128_{1-3}$, respectively.

Returning to a block 606 of FIG. 6, in this block the IA-32 environment emulation driver is loaded. The emulation driver, which comprises a SAL IA-32 EL (execution layer) or SAL thunk service, is used to emulate an IA-32 environment during the pre-boot. The virtual C- and D-segments are then initially mapped to the base address R, effectively mapping the virtual C- and D-segments to physical address space instance $122_1$.

The next set of operations relate to initializing various I/O devices for the system, as depicted by a decision block 608. In accordance with this decision block, I/O devices are identified and initialized until all applicable I/O devices have been processed. As discussed above, PCI devices are detected and enumerated and various PCI bridges are built during the pre-boot. The operations shown below decision block 608 may be performed after the PCI devices have been enumerated, or in-line with the PCI device detection and enumeration.

First, in a decision block 610, a determination is made to whether an option ROM is attached to the I/O device. If not, the device is initialized in its normal manner (not shown), and the logic returns to decision block 608 to identify the next I/O device to process. If an option ROM is attached, the logic proceeds to a block 612, wherein a determination is made to the size of the option ROM image. As discussed above, a PCI option ROM may contain multiple images. The ROM contents are loaded into system memory and the appropriate option ROM image is identified. The size of the image may be determined from information in the ROM header and/or the ROM image header. If a single image is present, the size of the image may be determined by proving the PCI option ROM BAR (base address register). The size of the ROM image is X.

Next, in a decision block 614 a determination is made to whether there is sufficient space remaining in the current physical address space instance (of the C- and D-segments) to store the option ROM image. If the answer is YES, X amount of memory is allocated from the current instance (identified as R(i) C- and D-segment) in a block 618.

Figure 5B:
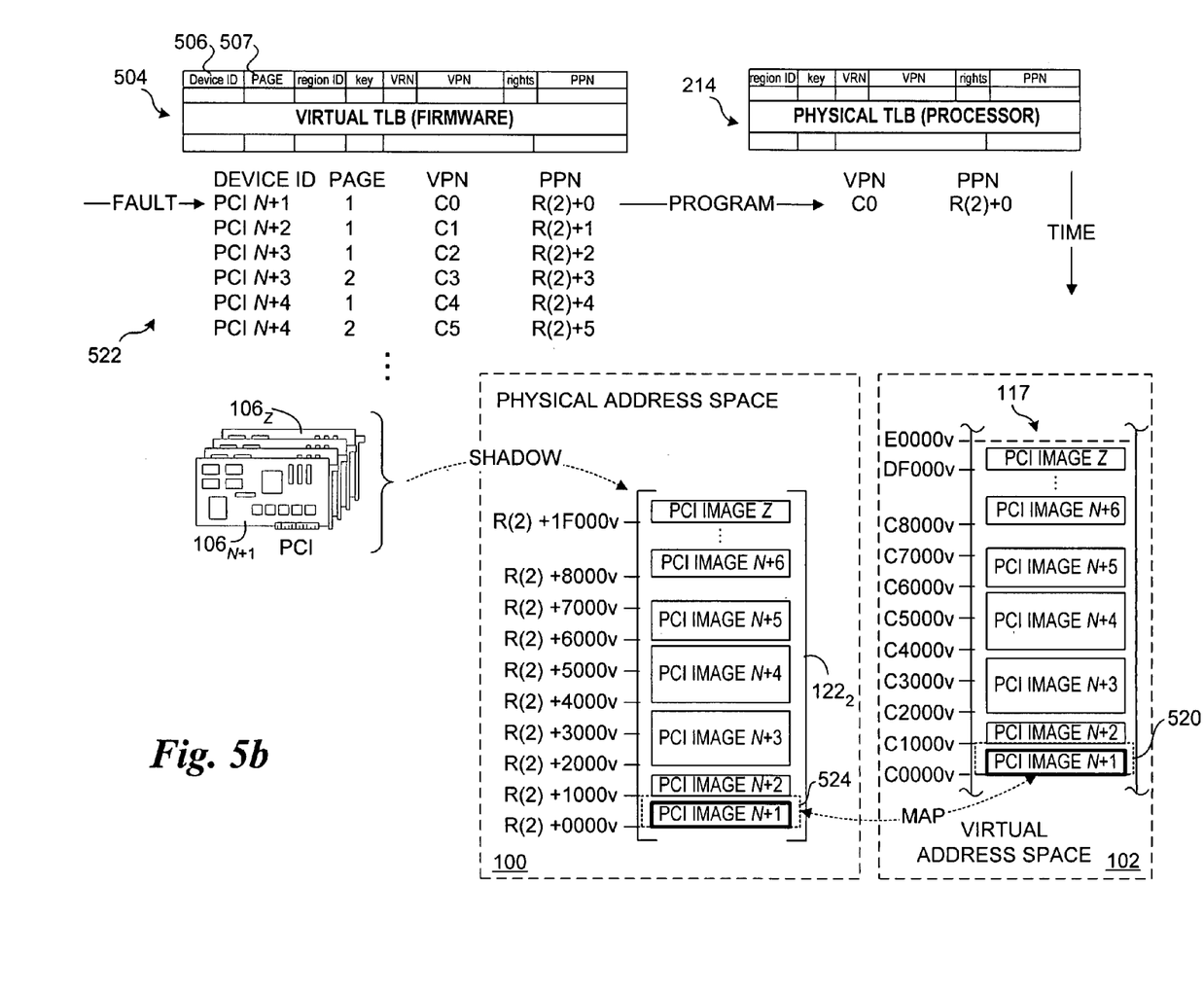
FIG. 5b is a schematic diagram illustrating further details of the scheme of FIG. 5a, wherein an option ROM image occupying less than one page size is accessed.
Figure 5C:
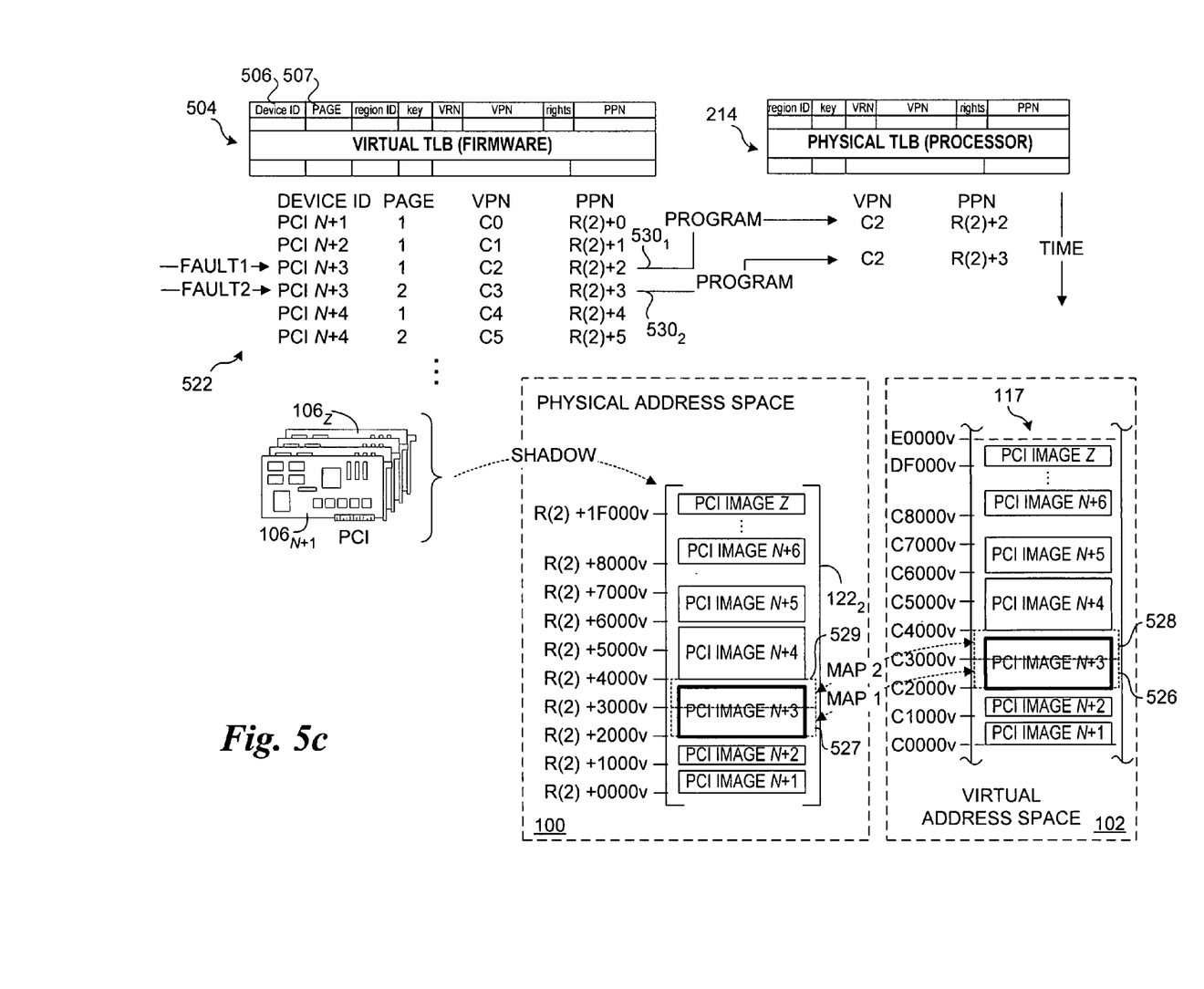
FIG. 5c is a schematic diagram illustrating further details of the scheme of FIG. 5a, wherein an option ROM image occupying multiple pages is accessed.

Information corresponding to a virtual TLB translation register entry or entries is then added to the virtual TLB 504 in a block 620. The first virtual TR entry for a given device or image will map the option ROM image to the base address of the current physical address space instance plus the offset of the base address of the image within that instance. In essence, the virtual TR entry maps logical image entry points to physical image entry points. In one embodiment, the TR enties reference pages (VPN's and PPN's) rather than full addresses, as shown in FIGS. 5b and 5c.

An extra requirement exists when images exceed the selected page size. For example, in one embodiment the default page size is set to 4K. If the option ROM image's size exceeds 4K, a portion of the image will need to be located other (sequentially following) pages. In view of this situation, additional virtual TR entries are created for each extra page.

If there is insufficient space remaining in the current instance to store the option ROM image, the answer to decision block 614 is NO, causing the logic to flow to a block 616. This requires the image to be stored in the next physical address space instance. Accordingly, in block 616 the mapping to the base address of the current physical space instance is increased from the current value R(i) to R(i)+128K. This effectively causes subsequent option ROM images to be loaded into the next physical address space instance. For example, in the example illustrated in FIG. 5, there was insufficient space left to store a PCI IMAGE N+1 in physical address space instance $122_1$, so the base address R(i) was incremented by 128K to the base address $128_2$ of physical address space instance $122_2$.

Once all of the option ROM images for applicable I/O devices have been loaded, the logic proceeds to invoke the EFI drivers for those devices in a block 622. The EFI drivers are then layered on appropriate legacy BIOS services. For example, the EFI BLOCK_IO_PROTOCOL, which is used to service block I/O devices, such as disk drives, is layered on the INT13h BIOS service. In general, this layering maps various EFI drivers to BIOS services provided via respective option ROM images.

The remaining set of operations comprise evaluation operations that are performed to service an EFI service call. The evaluation operations begin in response to detection of an EFI service call, as depicted by a decision block 650. In a decision block 652, a determination is made to whether the EFI service call invokes an EFI driver call to a legacy BIOS service provided by an option ROM image. If not, the service call is serviced using a non-legacy driver in accordance with a block 654.

If a legacy BIOS service is called, the logic proceeds to block 656. In this block, the device ID is determined via an EFI component. For example, there may be 10's or 100's of block I/O devices for a given platform, such as SCSI drives. The PCI card used to host a SCSI controller for a selected SCSI drive needs to be identified to service an access request to that drive. The conventional EFI framework includes an EFI component for determining device I) (i.e., identification of the PCI card or an ISA legacy card.

Once the device ID is determined, it is used as a lookup value to identify an entry in the virtual TLB 504 corresponding to the device. For example, the device ID may be used as an index into virtual TLB 504. The virtual TLB entry for the identified device includes information for translating a virtual address of the entry point for the device's option ROM image to the location of that image in the physical address space. As discussed above, this entry is created in block 620 during the initialization process.

Next, in a block 658 a processor translation register is programmed with information contained in the virtual TLB entry to effect a address translation from a virtual address in the virtual C- and D-segment (i.e., virtual address space 119) at which the option ROM image is logically located to the location at which the option ROM image is actually stored in the physical address space 100. More specifically, the translation register contains a mapping from the entry point of the option ROM image in the virtual address space to the entry point of the actual option ROM image code. The servicing process then invokes a call to the image entry point in the virtual C- and D-segment, which is translated to the physical address space entry point via the processor based on the corresponding TR entry.

In addition to physically storing option ROM images in physical C- and D-segment instances (i.e., in a grouped manner), an option ROM image may be stored in the physical address space on an individual basis, such as depicted in FIG. 1a for ISA legacy option ROM images. In this case, the operations of blocks 614, 616, and 618 are replaced with an operation that stores the option ROM image at some location in the physical address space. A corresponding virtual TLB entry for the image is then created in block 620 in a similar manner to that discussed above.

An example of a page translation process for an embodiment in which an option ROM image occupies a single page is shown in FIG. 5b. In this embodiment, the page size is 4K, and option ROM images are logically located at offsets that are multiples (0–N) of 4K from the base address of the virtual C-segment (0xC0000v). For example, the base address of a virtual page 520 in which a PCI IMAGE N+1 is logically located is 0xC0000v.

Meanwhile, the option ROM images are shadowed (i.e., actually stored) at location within physical address space 100. In the example illustrated in FIG. 5b, the option ROM images for PCI cards $106_{N+1}$ to $106_Z$ are stored an address space instance 1222, beginning at a base address of R(2) (i.e., R+128K). In the illustrated embodiment, the offset for each image in a physical address space instance and a corresponding common address space are the same. Thus, the base address for the physical instance of PCI IMAGE N+1 is R(2), which is also the physical entry point for the image.

The embodiments of FIGS. 5a–c perform address translation via page translations, with the page offsets being automatically passed through, as discussed above with reference to FIG. 2. Thus, the virtual TLB 504 includes entries 522 that map respective virtual pages to physical pages. Thus, virtual page 520 is mapped to a physical page 524 having a base address of R(2).

In response to an access request, an appropriate device or image is identified, and this information is used along with the current PAGE number to lookup an appropriate entry 522 in virtual TLB. In one embodiment, this process is initiated in response to a TLB Miss fault, which will occur if a memory reference is made while a corresponding address translation doesn't exist in the processor TLB 214 or the VHPT, as discussed above. In one embodiment, the legacy EFI component 502 (or another firmware components) causes the instruction pointer to reference a logical entry point for an option ROM image that is appropriate for servicing the call. When an address translation for the logical entry point cannot be found, control is passed to the firmware, which services the fault by programming a translation register corresponding to the processor TLB 214 with appropriate page translation data derived from the virtual TLB entry returned by the table lookup. Once the processor TLB is programmed, control is returned to the current execution stream, which vectors the instruction pointer (via the just-programmed address page translation) to the physical entry point of the option ROM image. The code in the image is then executed (either directly by the processor or via a virtual machine hosted by the processor (e.g., for EFI byte code), and returned to the calling entity upon completion.

An example of a situation in which the option ROM image occupies two memory pages is shown in FIG. 5c. More specifically, a PCI IMAGE N+3 is logically stored in virtual pages 526 and 528, while physically stored at physical pages 527 and 529. In this instance, a first fault causes the processor TLB 214 to be programmed with data derived from a virtual TLB entry 530₁, which causes an address translation from virtual page 526 to physical page 527. Upon passing the 4K boundary, a second TLB Miss fault is generated. This causes a second lookup in virtual TLB 504; this time, a virtual TLB entry $530_2$ corresponding to the second page of the image is retrieved and used to program the processor TLB 214. This causes access requests to the logical addresses of virtual page 528 to be translated to corresponding physical addresses of physical page 529. A similar process is continued if more pages are occupied by the option ROM image, as necessary to service the call.

The embodiments discussed above provide a mechanism for virtualizing option ROMs in a manner that enables multiple option ROM images to be mapped to a common address space reserved for legacy option ROM images. Thus, systems employing the scheme may logically extend the restricted 128K legacy option ROM conventional limit to enable a large number of option ROM images to be accessible to the system.

In some embodiment, option ROM images are logically stored in a virtual address space that is smaller than the physical address space required to store the images, thus necessitating overlapped images in the virtual address space. At the same time, the logical location and entry point of each image appears to other entities, including the option image code itself, to reside in the virtual address space. Normally, having multiple images mapped so as to overlap portions of the same address space would not be possible. However, the mappings, while continuously maintained by the firmware, are dynamically effectuated by programming the processor's TLB on an as-needed basis. This dynamic effectuation of the address translations enables multiple images to occupy the same address space.

Exemplary Computer Server System

Figure 7:
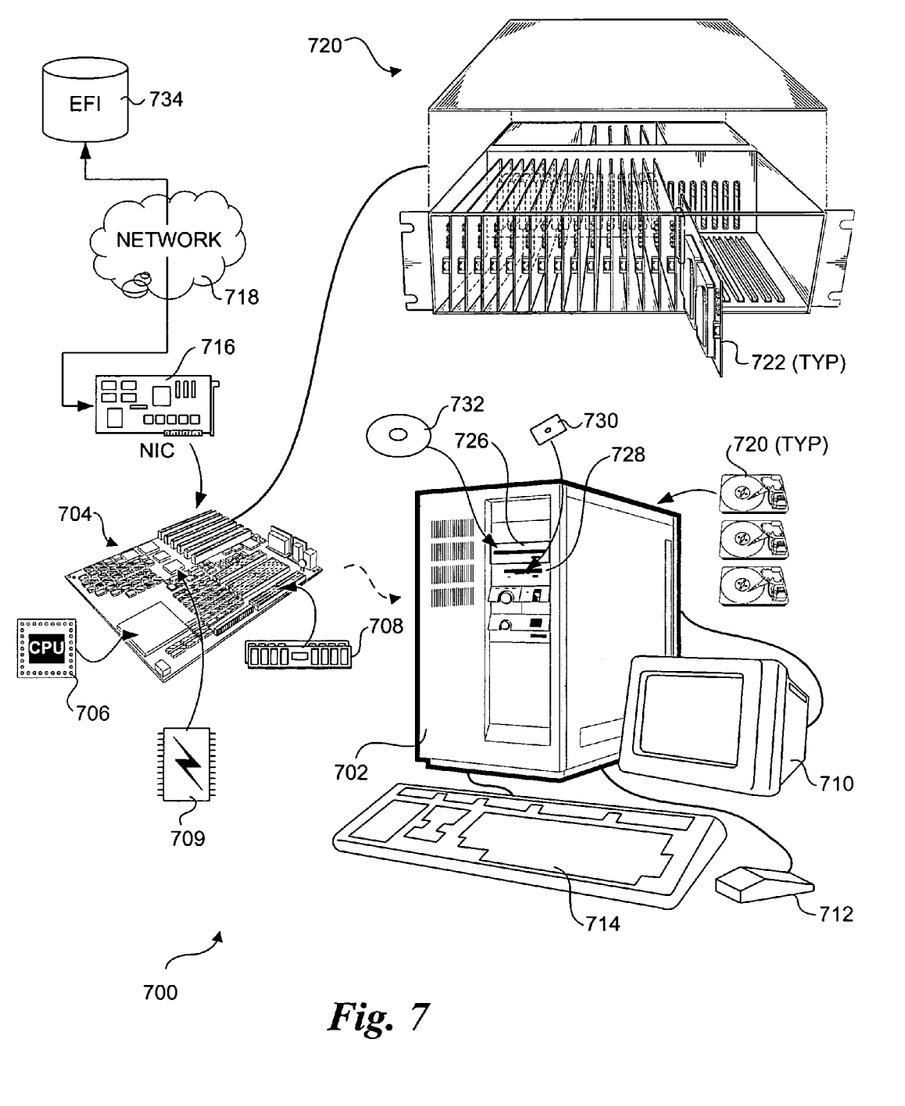
FIG. 7 is a schematic diagram of an exemplary computer server one which aspects of the embodiments disclosed herein may be practiced.

With reference to FIG. 7, a generally conventional computer server 700 is illustrated, which is suitable for use in connection with practicing aspects of the embodiments discussed herein. For example, computer server 700 may be used for hosting the firmware components discussed above. In addition to the exemplary configuration that is illustrated, computer server 700 represents other types of servers that may be suitable for hosting a moderate to large number of add-on peripheral cards, include stand-alone and enterprise-class servers operating UNIX-based and LINUX-based operating systems, as well as servers running the Microsoft Windows NT®, Windows 2000 or 2003 Server® operating systems.

Computer server 700 includes a chassis 702 in which is mounted a motherboard 704 populated with appropriate integrated circuits, including one or more processors 706 and memory (e.g., DIMMs or SIMMs) 708, as is generally well known to those of ordinary skill in the art. All or a portion of firmware for the system is stored in a boot firmware device (BFD) 709 coupled to motherboard 704.

A monitor 710 is included for displaying graphics and text generated by software programs, program modules, and firmware that are run by the computer server. A mouse 712 (or other pointing device) may be connected to a serial port (or to a bus port or USB port) on the rear of chassis 702, and signals from mouse 712 are conveyed to the motherboard to control a cursor on the display and to select text, menu options, and graphic components displayed on monitor 710 by software programs and modules executing on the computer. In addition, a keyboard 714 is coupled to the motherboard for user entry of text and commands that affect the running of software programs executing on the computer. Computer server 700 also includes a network interface card (NIC) 716, or equivalent circuitry built into the motherboard to enable the server to send and receive data via a network 718.

In general, computer server 700 is used to host a moderate to large number of add-on peripheral cards, including PCI and ISA legacy cards. In one embodiment, the chassis 702 of the computer server may be configured to house the add-on peripheral cards (not shown). In another embodiment, computer server 700 is configured to communicate with a number of add-on peripheral cards in one or more external racks or the like, such as depicted by an external rack 720 housing a plurality of add-on peripheral cards 722. In general, the add-on peripheral cards may provide various types of I/O functionality, including but not limited to disk drive controllers, network controllers, video controllers, audio controllers, etc.

Computer server 700 generally may include a compact disk-read only memory (CD-ROM) drive 726 into which a CD-ROM disk may be inserted so that executable files and data on the disk can be read for transfer into memory 708 and/or into storage on hard disk 720. Similarly, a floppy drive 728 may be provided for such purposes. Other mass memory storage devices such as an optical recorded medium or DVD drive may also be included. The machine instructions or interpreted code comprising the firmware components that cause processor(s) 706 to implement the operations of the embodiments that have been discussed above will typically be distributed on a non-volatile firmware device 709, or may be stored on floppy disks 730 or CD-ROMs 732 (or other memory media) and copied (e.g., flashed) to the non-volatile firmware device. Optionally, all or a portion of the firmware may be stored on one or more hard disks 720 or retrieved from a remote EFI firmware volume 734 via network 718 as a carrier wave file and loaded into memory 708 for execution by processor(s) 706.

Thus, embodiments of this invention may be used as or to support firmware instructions executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include articles such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    physically storing a plurality of images in a plurality of physical address space portions while logically storing the plurality of images in a common virtual address space, wherein at least a portion of the plurality of images logically stored in the common virtual address space are overlapping;
    receiving a request to access one of the plurality of images; and
    translating a logical entry point for the image requested to be accessed from a virtual address in the common virtual address space to a physical address in the physical address space portion in which the image is stored to access the image.

2. The method of claim 1, further comprising:
    building a virtual translation table containing entries corresponding to the plurality of images, each entry to map a virtual location in the common virtual address space at which an image is logically stored to a physical location in the physical address space at which the image is physically stored;
    identifying an entry in the virtual translation table corresponding to the image requested to be accessed, the entry including information for mapping the logical entry point of the image from the virtual location in the common virtual address space to the physical location in the physical address space instance; and
    programming a hardware component to automatically map an access request of the image from the virtual location in the common virtual address space to the physical location in the physical address space instance using information contained in the entry.

3. The method of claim 2, wherein the hardware component comprises a processor.

4. The method of claim 3, wherein the processor includes a plurality of translation registers, the method further comprising:
    dynamically programming a translation register to automatically effect a mapping of the access request.

5. The method of claim 2, further comprising:
    loading a set of the plurality of images into the same physical address space portion; and
    creating an entry in the virtual translation table for each of the images that are loaded, the entry defining a logical entry point for the image comprising a virtual address in the virtual address space that is mapped to a physical address comprising a physical entry point at which the image is accessed.

6. The method of claim 2, wherein the operation of programming the hardware component to automatically map the access request is performed by firmware.

7. The method of claim 1, wherein the plurality of images comprise option ROM (read-only memory) images.

8. The method of claim 7, wherein the option ROM images include at least one option ROM image stored on an ISA (industry standard architecture) legacy card.

9. The method of claim 7, wherein the option ROM images include at least one option ROM image stored on an PCI (peripheral component interface) card.

10. The method of claim 7, wherein the common virtual address space includes virtual addresses spanning C- and D-segments defined by the PC-AT (personal computer-advanced technology) architecture for storing option ROM images.

11. The method of claim 10, wherein at least one of the physical address space portions comprises an instance of the C- and D-segments.

12. A method, comprising:
    shadowing option ROM images into a physical address space of system memory for a computer system, each option ROM image that is shadowed having a respective physical entry point and being shadowed from an option ROM hosted by a respective peripheral card;
    logically storing the option ROM images that are shadowed in a common virtual address space, wherein at least a portion of the option ROM images in the common virtual address space are overlapping; and
    mapping a virtual address comprising a logical entry point to each option ROM image to a corresponding physical address comprising the physical entry point for that option ROM image.

13. The method of claim 12, wherein at least a portion of the option ROM images are shadowed into a physical address space instance having a size equivalent to a size of the common virtual address space.

14. The method of claim 13, wherein groups of option ROM images are shadowed into a respective physical address space instances having a size equivalent to the size of the common virtual address space.

15. The method of claim 12, wherein the common virtual address space includes virtual addresses spanning C- and D-segments defined by the PC-AT (personal computer-advanced technology) architecture for storing option ROM images.

16. The method of claim 12, further comprising:
    building a virtual translation table containing entries corresponding to the plurality of option ROM images, the entries including information to map a logical entry point for each option ROM image to its corresponding physical entry point.

17. The method of claim 16, further comprising:
    receiving an access request to a peripheral card;
    identifying an entry in the virtual translation table corresponding to the peripheral card requested to be accessed, the entry including information for mapping the logical entry point of the image from the virtual address in the common virtual address space to the physical address in the physical address space instance; and
    programming a hardware component to automatically map an access request of the image from the virtual address in the common virtual address space to the physical address in the physical address space instance using information contained in the entry.

18. The method of claim 12, wherein the option ROM images include at least one option ROM image stored on an ISA (industry standard architecture) legacy card.

19. The method of claim 12, further comprising:
performing the mapping such that it appears to system hardware that there are never any overlapping option ROM images in the common virtual address space.

20. An article of manufacture, comprising a machine-accessible medium having instructions stored thereon, which when executed perform operations including:
shadowing a plurality of option ROM images into portions of a physical address space; and
mapping a physical entry point for each of the plurality of option ROM images to a logical entry point corresponding to a virtual address in a common virtual address space such that the plurality of option ROM images logically reside in the common virtual address space,
wherein an aggregated size of the plurality of option ROM images is greater than a size of the common virtual address space.

21. The article of manufacture of claim 20, wherein the machine-accessible medium includes further instructions to perform the operation of:
programming a hardware component to automatically effectuate a mapping for an individual option ROM image in response to a request to access that option ROM image,
wherein the request to access the option ROM image references the logical entry point for the option ROM image.

22. The article of manufacture of claim 21, wherein the hardware component is a processor.

23. The article of manufacture of claim 21, wherein the machine-accessible medium includes further instructions to perform the operation of:
building a virtual translation table containing entries corresponding to the plurality of option ROM images, including entries to map a logical entry point for each option ROM image to its corresponding physical entry point; and
programming the hardware component using information contained in the entry corresponding to the option ROM image for which access is requested.

24. The article of manufacture of claim 20, wherein the common virtual address space includes virtual addresses spanning C- and D-segments defined by the PC-AT (personal computer-advanced technology) architecture for storing option ROM images.

25. The article of manufacture of claim 21, wherein the option ROM image physically occupies multiple physical pages and logically occupies multiple virtual pages, the machine-accessible medium including further instructions to perform the operation of:
detecting a page fault in response to an attempt to access a second virtual page at which a portion of the option ROM image is logically resides; and
programming a translation register to effect an address translation from the second virtual page to a second physical page at which a portion of the option ROM is shadowed.

26. A system, comprising:
a processor;
system memory, operatively coupled to the processor and defining a physical address space;
a plurality of expansion slots, operatively coupled to the processor, each expansion slot configured to accept an add-on peripheral card; and
a firmware storage device, having firmware instructions stored thereon, which when executed by one of the processor or a virtual machine hosted by the processor perform operations, comprising:
shadowing a plurality of option ROM images into portions of the physical address space, the option ROM images being stored on respective add-on peripheral cards that were installed in at least a portion of the plurality of expansion slots; and
for each of the plurality of option ROM images,
mapping a physical page or pages at which that option ROM image is shadowed to a corresponding virtual page or pages in a common virtual address space such that the plurality of option ROM images logically reside in the common virtual address space,
wherein a portion of the option ROM images are logically stored on overlapping virtual pages.

27. The system of claim 26, wherein the firmware storage device comprises a flash device.

28. The system of claim 26, wherein the processor comprises an Intel IA-64 architecture processor.

29. The system of claim 28, wherein the firmware instructions perform the further operations of:
detecting a request to access an option ROM image at its logical location; and
programming a translation register to effect an address translation from a virtual page at which the option ROM image is logically stored to a physical page at which the option ROM image is shadowed.

30. The system of claim 29, wherein the option ROM image physically occupies multiple physical pages and logically occupies multiple virtual pages, the firmware instructions to perform the further operations of:
detecting a page fault in response to an attempt to access a second virtual page at which a portion of the option ROM image is logically resides; and
programming a translation register to effect an address translation from the second virtual page to a second physical page at which a portion of the option ROM is shadowed.

* * * * *